March 9, 1943.  G. W. BUNGAY  2,313,622
APPARATUS FOR BLACK-LEADING ELECTROTYPE MOLDS
Filed Sept. 27, 1940  4 Sheets-Sheet 1
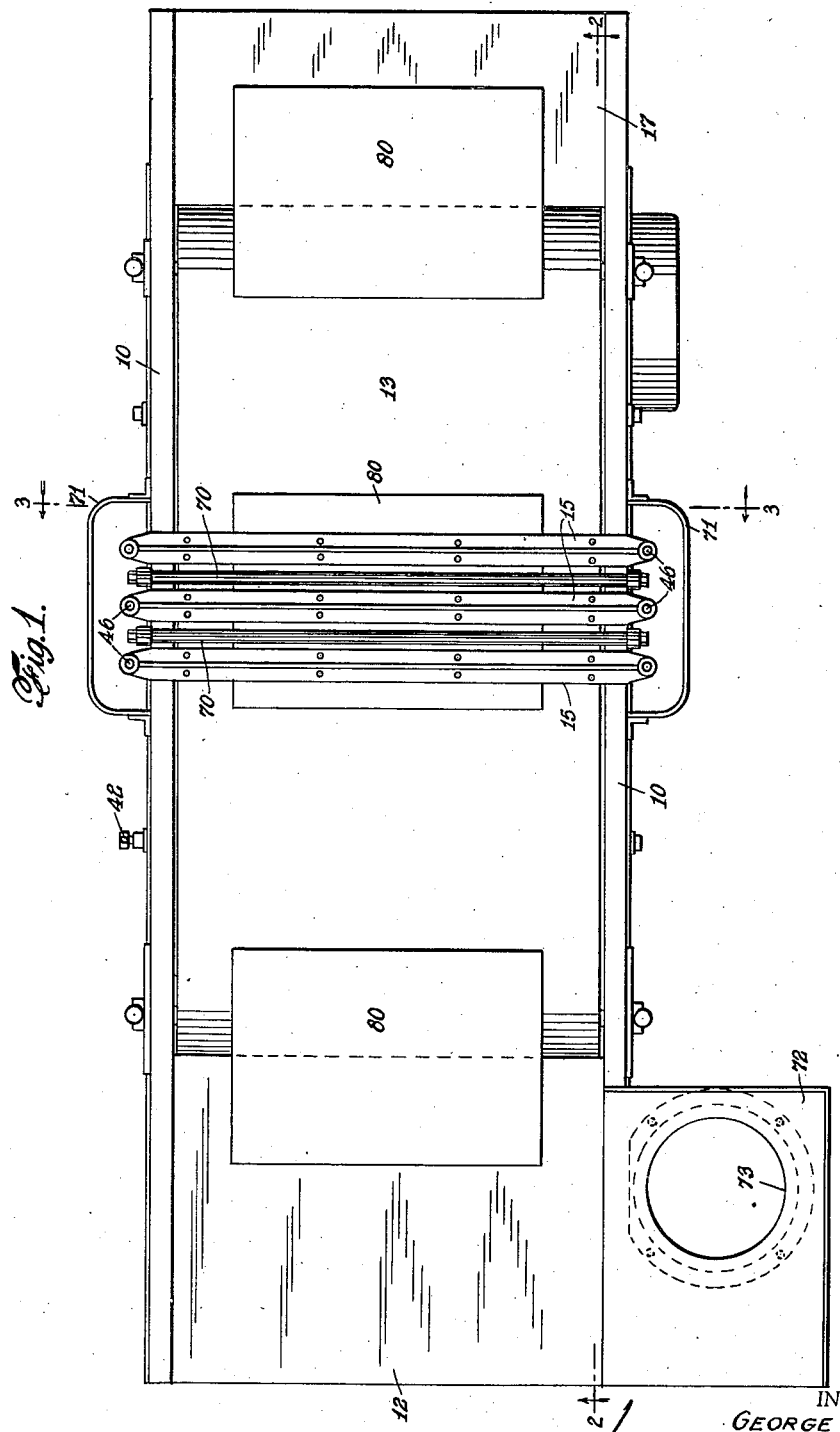
INVENTOR.
GEORGE W. BUNGAY
BY Wm. S. Pritchard
ATTORNEY.

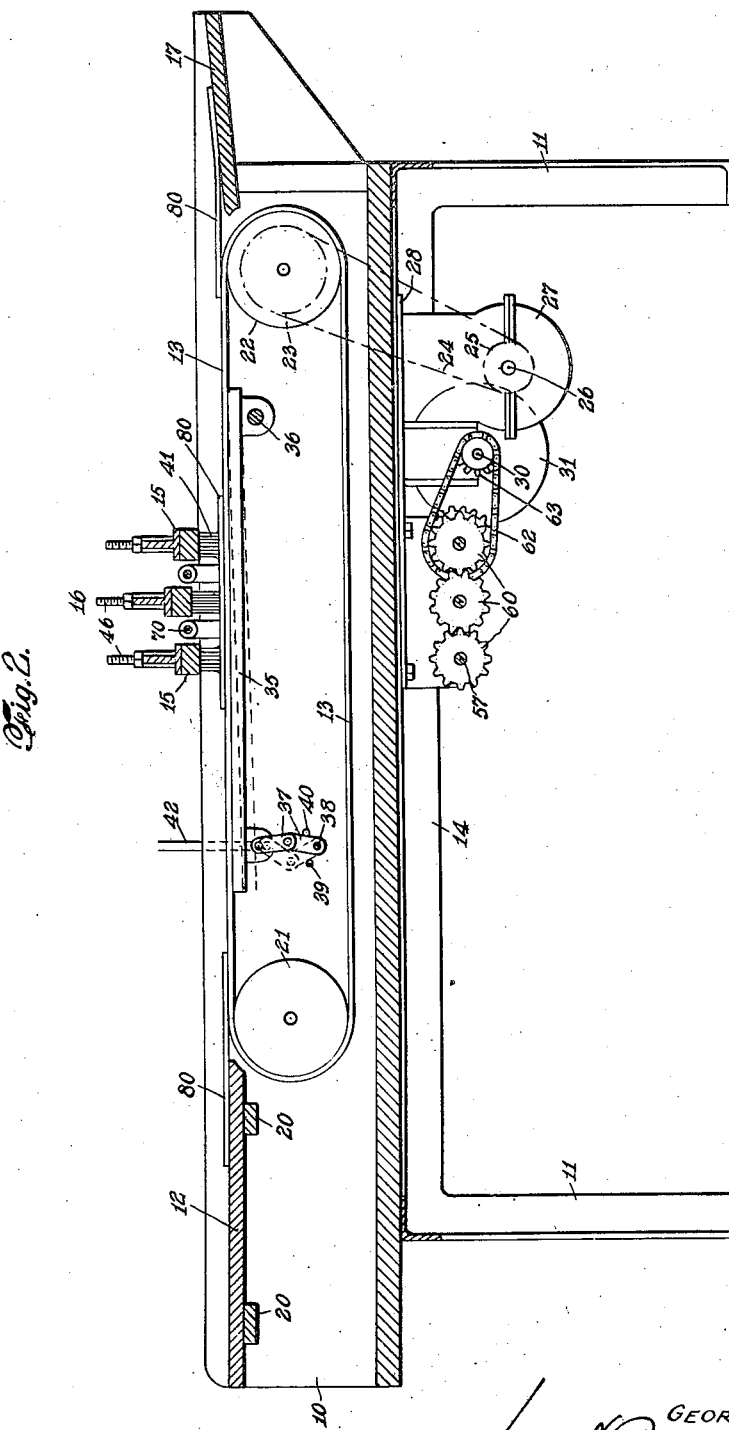

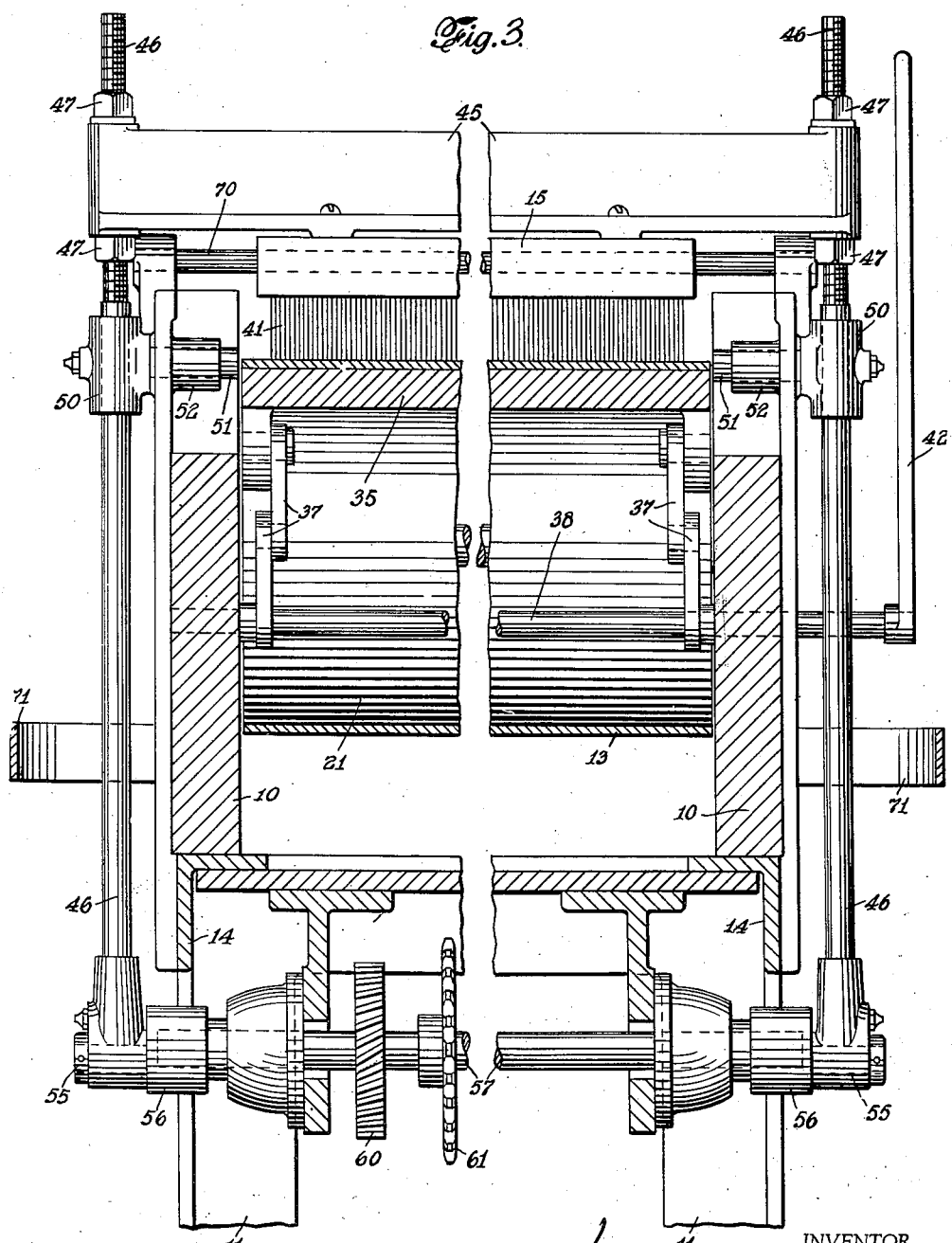

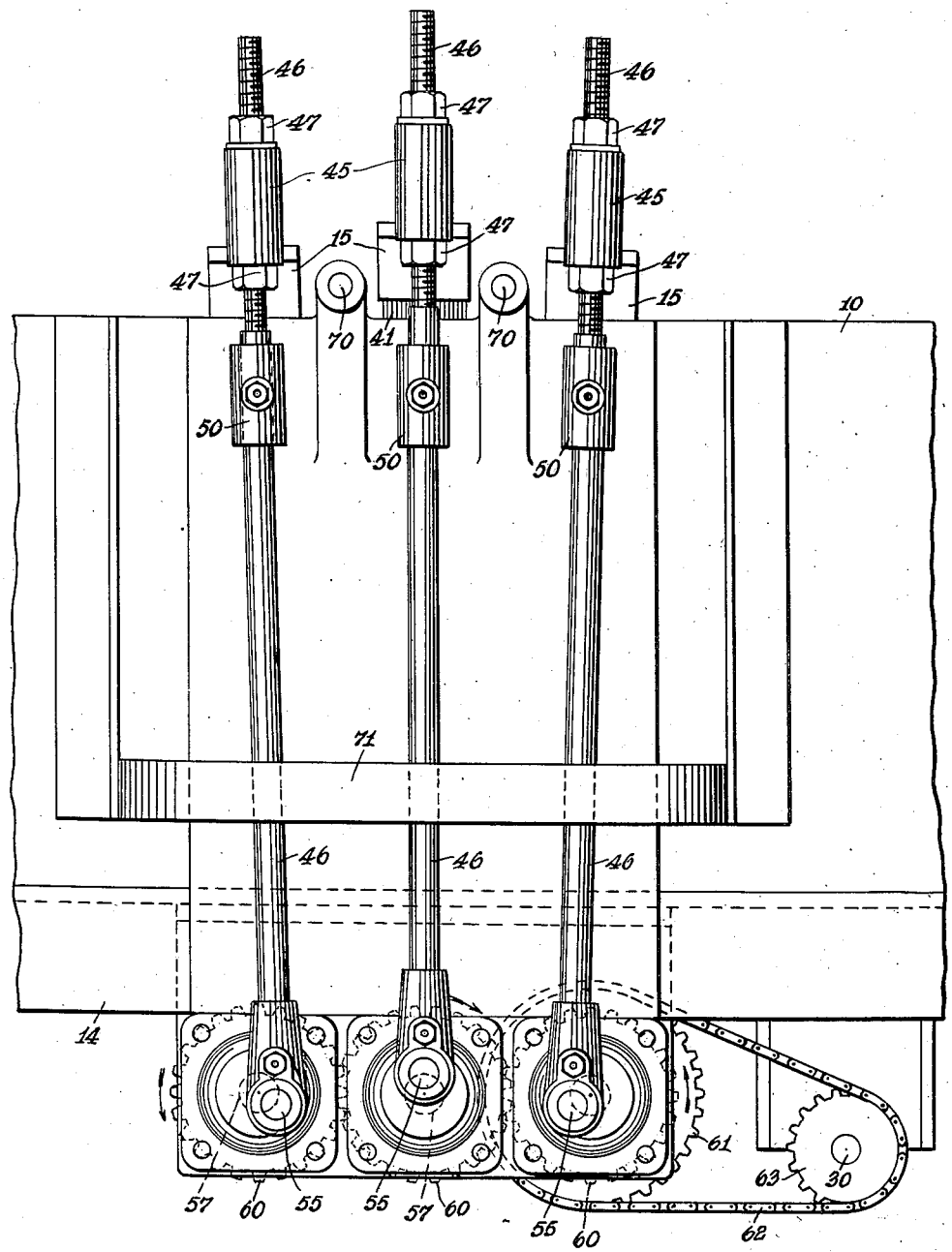

Patented Mar. 9, 1943

2,313,622

UNITED STATES PATENT OFFICE 2,313,622

APPARATUS FOR BLACK-LEADING ELECTROTYPE MOLDS

George W. Bungay, New York, N. Y.

Application September 27, 1940, Serial No. 358,740

10 Claims. (Cl. 91—7.5)

This invention relates to an apparatus for black leading an electrotype mold.

An object of the invention is to provide a novel and improved device of the type above indicated.

Another object is to provide a mechanism of the above type having means for causing the layer of black lead to become intimately bonded to the surface of the mold.

Various other objects and advantages will be apparent as the nature of the invention is more fully disclosed.

Although the novel features which are believed to be characteristic of this invention are pointed out more particularly in the claims appended hereto, the invention itself may be better understood by referring to the following description, taken in connection with the accompanying drawings in which a specific embodiment thereof has been set forth for purposes of illustration.

In the drawings:

Figure 1 is a top plan view of a black-leading machine embodying the present invention;

Figure 2 is a longitudinal section taken on the line 2—2 of Figure 1;

Figure 3 is a transverse section taken on the line 3—3 of Figure 1; and

Figure 4 is an enlarged detail view showing the drive mechanism for the brushes.

In the following description and in the claims certain specific terms are used for convenience in referring to the various details of the invention. These terms, however, are to be given as broad an interpretation as the state of the art will permit.

Referring to the drawings more in detail, the invention is shown as comprising a machine having a frame 10, mounted on a base 14, supported on suitable legs 11. The frame 10 carries a supply table 12, a conveyer 13 adapted to feed material past a set of brushes 15 at a treating station 16, and a discharge table 17.

The supply table 12 is mounted on suitable cross-members 20 which are secured to the frame 10. The discharge table 17 is similarly mounted on the frame 10 and extends into proximity with the conveyer belt 13 so as to receive the treated material therefrom. The conveyer belt 13 is mounted on a pair of rollers 21 and 22 which are journaled in suitable bearings (not shown) carried by the frame 10. One of the rollers (shown as the roller 22) is provided with a sprocket 23 which is driven by a suitable chain 24 from a sprocket 25 carried on a shaft 26. The shaft 26 is driven by a gear train (not shown) mounted within a gear box 27, which is supported by a bracket 28 from the frame 10. The gear train in the gear box 27 is driven by a suitable connection from the shaft 30 of a motor 31, which is likewise supported by the frame 10.

The conveyer belt 13, as it passes the treating station 16, is supported by a platform 35 which extends across substantially the entire width of the belt and is pivoted at one end on a rod 36 which is secured in the frame 10. The other end of the platform 35 is supported by a pair of sets of pivoted links 37, acting as a toggle, which are attached to a rod 38. Stops 39 and 40 are provided to limit the movement of the links 37 in each direction and are arranged so that, in the position shown in dotted lines in Figure 2, the platform 35 is retracted so as to allow the belt 13 to drop out of contact with the bristles 41 of the brushes 15 and, in the position shown in full lines, the belt 13 is held in working position so that the material conveyed thereby is acted upon by the bristles of the brushes 15. The stops 39 and 40 allow the links to move past the center position so that no locking or holding means is required.

The rod 38 is journaled in the frame 10 and extends to the side of the machine. A handle 42 is secured to the rod 38 to control the operating position of the platform 35.

Each brush 15 is attached to a head 45 which extends across the machine and is mounted at its two ends on rods 46. Nuts 47 are provided for adjusting and securing the head 45 in position on said rods. Each rod 46 extends through a sleeve 50 which is pivotally mounted at about the plane of the conveyer belt 13 by means of a shaft 51 journaled in a boss 52 formed on the frame 10. The rods 46 carrying each head 45 are connected at their lower ends to eccentric pins 55 carried on eccentrics 56 which are mounted on a shaft 57. The shafts 57 carry intermeshing gears 60 by means of which they are driven. In the embodiment shown, the brushes 15 operate in sequence so that successive action is obtained and so that at least one brush is in contact with the sheet material on the conveyer 13 at all times. They may, however, be operated so as to work together or in any other desired relationship. One of the shafts 57 carries a sprocket 61 driven by a chain 62 from a sprocket 63 mounted on the shaft 30 of the motor 31.

A plurality of tie rods 70 (Figure 1) extends across the machine adjacent the brushes 15 to strengthen the assembly. Suitable guards 71 may be secured to the frame 10 in a position to shield the drive mechanism. A table 72 containing a well 73 adapted to receive the black lead, to be described, is shown as mounted adjacent the supply table 12.

In the operation of this machine the motor 31, through the gears in the gear box 27, drives the conveyer belt 13 at a predetermined rate of speed. At the same time, through the chain 62 and the gears 60, the eccentrics 56 are caused to rotate. The rotation of the eccentrics causes the rods 46 to reciprocate vertically and thereby imparts a vertical reciprocating movement to the brushes 15 which causes the bristles 41 to impact against the surface of the sheet material on the conveyer belt. The eccentrics 56 also impart a slight rocking movement to the rods 46 and cause a similar rocking movement of the brushes as they are vertically reciprocated.

In using the above-described machine for applying a coating of black lead or graphite to an electrotype mold, the black lead is made into a water-suspension in the form of a thick paste which may be stored for use in the well 73. The electrotype mold, which may comprise a sheet 80 of thermoplastic material of the type described in my copending application for "Electrotype mold and method of making same," filed on even date herewith, is placed upon the supply table 12 and a quantity of the black lead paste from the well 73 is applied to the surface of the mold and may be spread thereover to the extent required by the subsequent brushing. The mold is then fed by the conveyer belt 13 under the brushes 15 which reciprocate vertically and are rocked to work or tamp the black lead into the surface of the mold. The bristles 41 of the brushes 15 pick up a quantity of black lead and act in a manner similar to a pencil to coat the surface of the mold 80 with black lead and to cause the same to be bonded thereto as an adherent, uniform, continuous coating as the mold advances past the brushes. After treatment, the mold is discharged onto the discharge table 17.

After the machine has been in operation for a time, the brushes become coated with the black lead and serve to spread the same over the entire surface of the mold and to apply the coating uniformly to all parts thereof. This action may be facilitated, however, by spreading the black lead paste over the mold when it is applied from the well 73 or, in certain instances, by applying the paste at least across the entire width of the leading end of the mold. The brushes then pick up and spread the black lead over the entire surface as above indicated. In a preferred embodiment, the brushes each operate at a sufficiently rapid rate with respect to the speed of movement of the conveyer to contact each portion of the mold a plurality of times as it passes thereunder. The vertical and rocking movement of the brushes and the advancing movement of the mold thus cause the bristles to impact against and wipe over the surface for applying a uniform coating over the entire area of the mold.

It is to be understood that the belt and brushes should be in a wet condition in order to avoid drying out the black lead during the above process. If necessary, the belt and bristles may be wet by suitable means, such as by sprinkling, before the black-leading operation is begun and at suitable intervals thereafter in the event that there is any tendency for the machine to dry out. It has been found preferable to maintain the black lead in the form of a thick paste, as above mentioned, during the black-leading operation in order to facilitate picking up of the black lead by the bristles 41 and the spreading thereof in a coating having the characteristics above specified.

As the molds are passed under the brushes 15, the platform 35 forms a rigid support and permits the brushes to produce the necessary impact for working or tamping the black lead into the surfaces. However, when the machine is idle, it is desirable to remove the belt 13 from contact with the brushes in order to avoid distorting the bristles 41. This may be accomplished by means of the handle 42 and the toggle links 37 which are adapted to lower one end of the platform 35 a sufficient distance to drop the belt 13 out of contact with the brushes 15.

The machine is particularly adapted to apply a coating of electrotype black lead to a thermoplastic sheet material, the surface of which has been slightly roughened, as set forth in my copending application above mentioned, so as to provide a plurality of irregularities in the surface which are capable of receiving and retaining the black lead and causing the coating to adhere and be bonded to the surface of the sheet material. In the case of an electrotype mold, the black-leading operation may take place both before and after molding the thermoplastic sheet material to form the electrotype mold so as to produce the complete, continuous, uniform, compact coating required for electroplating.

Although a specific embodiment of the invention has been shown for purposes of illustration, it is to be understood that the invention is capable of various uses and that changes and modifications may be made therein, as will be readily apparent to a person skilled in the art. The invention is only to be limited in accordance with the scope of the following claims.

I claim:

1. A machine for applying a coating of black lead or the like to a sheet material, comprising conveyer means to feed said material past a treating station, brush means at said station positioned to engage the surface of said material, said brush means comprising a brush extending across said conveyer means with bristles extending downwardly to contact said surface, a pair of rods carrying opposite ends of said brush and extending downwardly on opposite sides of said conveyer means, and eccentric means actuating said rods to cause said brush to reciprocate vertically for tamping said black lead into said surface as the sheet material is fed along by said conveyer means.

2. A machine for applying a coating of black lead or the like to a sheet material, comprising conveyer means to feed said material past a treating station, brush means at said station positioned to engage the surface of said material, said brush means comprising a brush extending across said conveyer means with bristles extending downwardly to contact said surface, a pair of rods carrying opposite ends of said brush and extending downwardly on opposite sides of said conveyer means, eccentrics connected to the lower ends of said rods to cause vertical reciprocation thereof, and sleeves carrying said rods for sliding movement therein, said sleeves being pivoted at about the plane of said conveyer means whereby the brushes are caused to reciprocate vertically and to rock over the surface for tamping said black lead into said surface as the sheet material is fed along by said conveyer means.

3. A machine for applying a coating of black lead or the like to a sheet material, comprising conveyer means to feed said material past a treating station, brush means at said station positioned to engage the surface of said material, said brush means comprising a plurality of parallel brushes each extending across said conveyer means with bristles extending downwardly to contact said surface, a pair of rods carrying opposite ends of each brush and extending downwardly on opposite sides of said conveyer means, a cross shaft carrying eccentrics connected to each pair of rods for causing vertical reciprocation thereof, and driving means to drive all of said cross shafts and said conveyer means to cause said brushes to reciprocate vertically for tamping said black lead into said surface as the sheet material is fed along by said conveyer means.

4. A machine for applying a coating of black lead or the like to a sheet material, comprising conveyer means to feed said material past a treating station, brush means at said station positioned to engage the surface of said material, said brush means comprising a plurality of parallel brushes each extending across said conveyer means with bristles extending downwardly to contact said surface, a pair of rods carrying opposite ends of each brush and extending downwardly on opposite sides of said conveyer means, a cross shaft carrying eccentrics connected to each pair of rods for causing vertical reciprocation thereof, sleeves carrying said rods for sliding movement therein, said sleeves being pivoted at about the plane of said conveyer means, and driving means to drive all of said cross shafts and said conveyer means to cause said brushes to reciprocate vertically and to rock over said surface for tamping said black lead into said surface as the sheet material is fed along by said conveyer means.

5. A machine for applying a coating of black lead or the like to a sheet material, comprising a conveyer means to feed said material past a treating station, brush means at said station positioned to engage the surface of said material, and means causing said brush means to reciprocate vertically for tamping said black lead into said surface as the sheet material is fed along by said conveyer means, means normally holding said conveyer means in operative position with respect to said brush means, and means releasing said holding means to retract said conveyer means from contact with said brush means when the machine is idle.

6. A machine for applying a coating of black lead or the like to a sheet material, comprising a conveyer means to feed said material past a treating station, brush means at said station positioned to engage the surface of said material, means causing said brush means to reciprocate vertically for tamping said black lead into said surface as the sheet material is fed along by said conveyer means, a platform beneath said conveyer means at said treating station normally holding said conveyer means in operative position with respect to said brush means, and means lowering said platform to thereby release said conveyer means from contact with said brush means when the machine is idle.

7. A machine for applying a coating of black lead or the like to a sheet material, comprising a conveyer means to feed said material past a treating station, brush means at said station positioned to engage the surface of said material, means causing said brush means to reciprocate vertically for tamping said black lead into said surface as the sheet material is fed along by said conveyer means, a platform beneath said conveyer means at said treating station normally holding said conveyer means in operative position with respect to said brush means, said platform being pivoted at one end for swinging downwardly to release said conveyer means from contact with said brush means when the machine is idle, and actuating means for said platform accessible to an operator.

8. A machine for applying a coating of black lead or the like to a sheet material, comprising a conveyer means to feed said material past a treating station, brush means at said station positioned to engage the surface of said material, means causing said brush means to reciprocate vertically for tamping said black lead into said surface as the sheet material is fed along by said conveyer means, a platform beneath said conveyer means at said treating station normally holding said conveyer means in operative position with respect to said brush means, said platform being pivoted at one end for swinging downwardly to release said conveyer means from contact with said brush means when the machine is idle, a pair of links connected to said platform to form a toggle, means actuating said toggle to raise or lower said platform, and stop means to hold said toggle in either of said positions.

9. A machine for applying a coating of black lead or the like to a sheet material, comprising a conveyer belt to feed said material past a treating station, brush means at said station positioned to engage the surface of said material, means causing said brush means to reciprocate vertically for tamping said black lead into said surface as the sheet material is fed along by said conveyer belt, a platform beneath said conveyer belt at said treating station normally holding said conveyer belt in operative position with respect to said brush means, and means lowering said platform to thereby release said conveyer belt from contact with said brush means when the machine is idle.

10. A machine for applying a coating of black lead or the like to a sheet material, comprising a conveyer belt to feed said material past a treating station, brush means at said station positioned to engage the surface of said material, said brush means comprising a plurality of parallel brushes each extending across said conveyer means with bristles extending downwardly to contact said surface, a pair of rods carrying opposite ends of each brush and extending downwardly on opposite sides of said conveyer belt, a cross shaft carrying eccentrics connected to each pair of rods for causing vertical reciprocation thereof, sleeves carrying said rods for sliding movement therein, said sleeves being pivoted at about the plane of said conveyer belt, driving means to drive all of said cross shafts and said conveyer belt to cause said brushes to reciprocate vertically and to rock over said surface for tamping said black lead into said surface as the sheet material is fed along by said conveyer belt, a platform beneath said conveyer belt at said treating station normally holding said belt in operative position with respect to said brushes, and means lowering said platform to thereby release said belt from contact with said brushes when the machine is idle.

GEORGE W. BUNGAY.